US011208927B2

United States Patent
Kalyankar et al.

(10) Patent No.: US 11,208,927 B2
(45) Date of Patent: Dec. 28, 2021

(54) SYSTEMS AND METHODS FOR CONTROLLING FLOW DISTRIBUTION IN AN AFTERTREATMENT SYSTEM

(71) Applicant: Cummins Emission Solutions Inc., Columbus, IN (US)

(72) Inventors: Apoorv Kalyankar, Madison, WI (US); Daniel Maciejewski, Middleton, WI (US); John G. Buechler, Indianapolis, IN (US); Ryan M. Johnson, Cottage Grove, WI (US); Randolph G. Zoran, McFarland, WI (US); Achuth Munnannur, Verona, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 149 days.

(21) Appl. No.: 16/480,769

(22) PCT Filed: Jan. 27, 2017

(86) PCT No.: PCT/US2017/015297

§ 371 (c)(1),
(2) Date: Jul. 25, 2019

(87) PCT Pub. No.: WO2018/140029

PCT Pub. Date: Aug. 2, 2018

(65) Prior Publication Data

US 2021/0131329 A1 May 6, 2021

(51) Int. Cl.
*F01N 3/021* (2006.01)
*F01N 3/28* (2006.01)
*F01N 3/20* (2006.01)

(52) U.S. Cl.
CPC ......... *F01N 3/0212* (2013.01); *F01N 3/0217* (2013.01); *F01N 3/2892* (2013.01);
(Continued)

(58) Field of Classification Search
CPC .... F01N 3/0212; F01N 3/0217; F01N 3/2892; F01N 2240/20; F01N 2470/02; F01N 2470/04; F01N 2470/24
See application file for complete search history.

(56) References Cited

U.S. PATENT DOCUMENTS

| 3,154,388 A | 10/1964 | Purse |
| 4,371,053 A | 2/1983 | Jones |

(Continued)

FOREIGN PATENT DOCUMENTS

| DE | 41 21 940 A1 | 1/1993 |
| DE | 10306133 A1 | 9/2003 |

(Continued)

OTHER PUBLICATIONS

International Search Report & Written Opinion for PCT/US2017/015297 dated Jun. 19, 2017, 12 pages.

*Primary Examiner* — Jonathan R Matthias
(74) *Attorney, Agent, or Firm* — Foley & Lardner LLP

(57) ABSTRACT

An aftertreatment component includes an inlet connector tube, an outlet connector tube, a chamber, a flow dissipater, and a substrate. The inlet connector tube receives exhaust gasses. The chamber is between the inlet connector tube and the outlet connector tube. The flow dissipater is positioned around the inlet connector tube and within the chamber. The flow dissipater receives the exhaust gasses from the inlet connector tube and includes a plurality of perforations. The plurality of perforations defines an open area of the flow dissipater. The open area of the flow dissipater is greatest proximate to the inlet connector tube and progressively decreasing proximate to the outlet connector tube. The substrate is positioned within the chamber and receives the exhaust gasses from the flow dissipater and provides the treated exhaust gasses to the outlet connector tube. The (Continued)

exhaust gases are expelled through the flow dissipater via the plurality of perforations.

24 Claims, 10 Drawing Sheets

(52) U.S. Cl.
CPC ............ *F01N 3/021* (2013.01); *F01N 3/2066* (2013.01); *F01N 2240/20* (2013.01); *F01N 2470/02* (2013.01); *F01N 2470/04* (2013.01); *F01N 2470/20* (2013.01); *F01N 2470/30* (2013.01); *F01N 2490/08* (2013.01); *F01N 2610/02* (2013.01)

(56) References Cited

U.S. PATENT DOCUMENTS

| | | |
|---|---|---|
| 4,838,901 A | 6/1989 | Schmidt et al. |
| 5,121,601 A * | 6/1992 | Kammel ............... B01D 53/944 60/275 |
| 5,246,472 A | 9/1993 | Herman et al. |
| 5,551,971 A | 9/1996 | Chadderton et al. |
| 5,892,186 A * | 4/1999 | Flugger .................. F01N 1/10 181/252 |
| 7,380,397 B2 * | 6/2008 | Chang .................... F01N 1/003 181/247 |
| 7,748,212 B2 | 7/2010 | Sedlacek et al. |
| 8,256,569 B1 | 9/2012 | Huff et al. |
| 8,302,389 B2 | 11/2012 | Strots et al. |
| 2003/0034201 A1 | 2/2003 | Lin |
| 2006/0029527 A1 * | 2/2006 | Pellegrino ................ B01J 35/06 422/177 |
| 2010/0263354 A1 | 10/2010 | Sedlacek et al. |
| 2011/0113755 A1 * | 5/2011 | Kim .................... B01D 46/0027 60/275 |
| 2013/0180798 A1 * | 7/2013 | Matsushima ....... F01N 13/0097 181/228 |
| 2015/0040537 A1 | 2/2015 | Hicks et al. |
| 2016/0312680 A1 * | 10/2016 | Gehrlein ................ B01F 5/0451 |

FOREIGN PATENT DOCUMENTS

| | | |
|---|---|---|
| DE | 10306134 A1 | 9/2003 |
| FR | 2663985 A1 | 1/1992 |
| GD | 0 460 148 A | 1/1937 |
| WO | WO-2008/112343 A2 | 9/2008 |
| WO | WO-2009/107376 A1 | 9/2009 |
| WO | WO-2014/172866 A1 | 10/2014 |

* cited by examiner

SYSTEMS AND METHODS FOR CONTROLLING FLOW DISTRIBUTION IN AN AFTERTREATMENT SYSTEM

CROSS-REFERENCE TO RELATED APPLICATIONS

The present application is a National Stage of PCT Application No. PCT/US2017/015297, filed Jan. 27, 2017, the contents of which are hereby incorporated by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a Selective Catalytic Reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, diesel exhaust fluid (DEF), or aqueous urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber. The SCR system may include one or more sensors to monitor conditions within the exhaust system.

SUMMARY

In an embodiment, an aftertreatment component includes an inlet connector tube, an outlet connector tube, a chamber, a flow dissipater, and a substrate. The inlet connector tube receives exhaust gasses. The chamber is between the inlet connector tube and the outlet connector tube. The flow dissipater is positioned around the inlet connector tube and within the chamber. The flow dissipater receives the exhaust gasses from the inlet connector tube. The flow dissipater includes a plurality of perforations. The plurality of perforations defines an open area of the flow dissipater. The open area of the flow dissipater is greatest proximate to the inlet connector tube and progressively decreasing proximate to the outlet connector tube. The substrate is positioned within the chamber and receives the exhaust gasses from the flow dissipater and provides treated exhaust gasses to the outlet connector tube. The exhaust gases are expelled through the flow dissipater via the plurality of perforations.

In another embodiment, an aftertreatment component includes an inlet, an outlet, a chamber, a flow dissipater, and a substrate. The inlet receives exhaust gasses. The chamber is positioned between the inlet and the outlet. The flow dissipater is positioned around the inlet. The flow dissipater receives the exhaust gasses from the inlet. The flow dissipater defines a first shape. The substrate is located within the chamber. The substrate receives the exhaust gasses from the flow dissipater and provides exhaust gasses to the outlet. The substrate defines a second shape. The first shape and the second shape cooperate to form a radial gap between the flow dissipater and the substrate. The radial gap has a first length proximate to the inlet and a second length, larger than the first length, proximate to the outlet.

In still another embodiment, an aftertreatment system includes a first aftertreatment component, a second aftertreatment component, and a third aftertreatment component. The first aftertreatment component provides exhaust gasses. The second aftertreatment component receives treated exhaust gases. The third aftertreatment component receives the exhaust gasses from the first component and provides the treated exhaust gasses to the second component. The third aftertreatment component includes a flow dissipater and a substrate. The flow dissipater receives the exhaust gasses from the first component in an axial flow. The flow dissipater is configured to provide the exhaust gasses in a radial flow. The flow dissipater includes a plurality of perforations and a plurality of vanes. The plurality of perforations and the plurality of vanes are configured to cooperatively redirect the axial flow to the radial flow. The substrate receives the exhaust gasses from the flow dissipater and provides the treated exhaust gasses to the second component.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
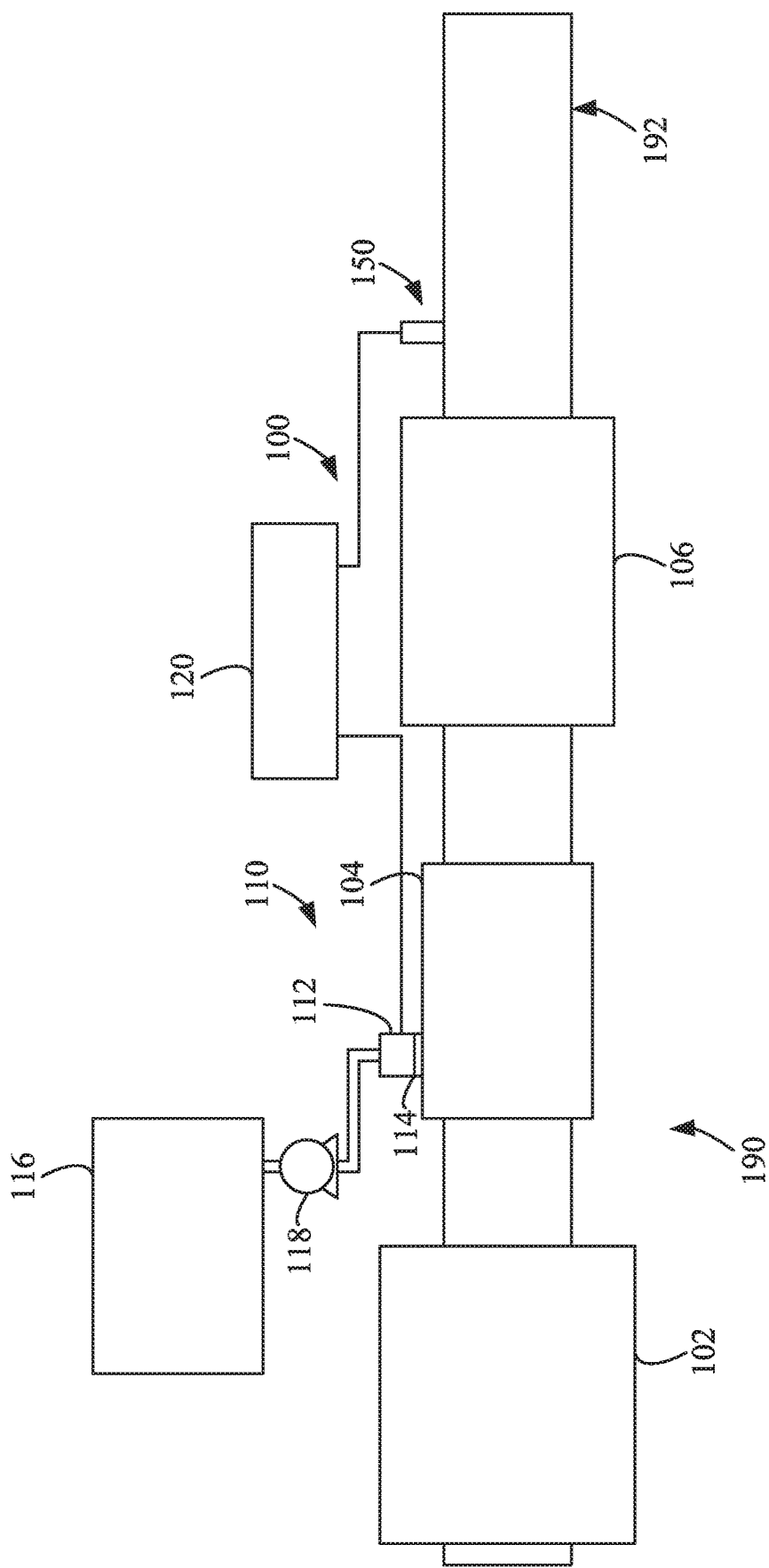
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for flow distribution in an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often filtered within an aftertreatment system. This filtering often occurs through the passing of the exhaust gasses through a substrate. Conventional filters encounter issues distributing the flow of exhaust gases on the substrate. For example, conventional filters may distribute a large portion of the flow near the center of the substrate and a small, or even a virtually nonexistent, portion of the flow near edges of the substrate. As a result, the exhaust gases in conventional filters experience a substantial pressure drop, which causes the aftertreatment system to operate inefficiently. Some conventional filters attempt to redistribute the flow of exhaust gases on the substrate by increasing the size of the conventional filter. However, this approach typically causes the filter to experience an even greater pressure drop and causes the conventional filters to take up more space.

Implementations described herein relate to an aftertreatment component (such as a particulate filter, a SCR catalyst, etc.) that includes a flow dissipater that receives exhaust gases from an inlet and a substrate that receives the exhaust gases from the dissipater and provides filtered exhaust gases to an outlet. In many implementations, the substrate surrounds the flow dissipater, and the flow dissipater is centered along a central axis of the substrate. The flow dissipater includes a plurality of perforations through which exhaust gases are expelled and a plurality of vanes that function to direct the exhaust gases expelled from the plurality of perforations. The plurality of perforations define an open area of the flow dissipater. The plurality of perforations are located and structured such that the open area of the flow dissipater is greatest proximate to the inlet and progressively decreases along the length of the flow dissipater towards the outlet. The flow dissipater and the substrate define a radial distance between the flow dissipater and the substrate. The flow dissipater and the substrate are structured to cooperatively increase this radial distance along the length of the flow dissipater towards the outlet.

In some implementations, the flow dissipater is frustoconical in shape and has a diameter proximate the inlet which is greater than a diameter farther away (distal) from the inlet. In these implementations, the substrate has a cylindrical shape. In other implementations, the flow dissipater is cylindrical in shape and the substrate is frustoconical in shape. In these implementations, the substrate has a diameter proximate the inlet which is less than a diameter farther away (distal) from the inlet.

In the implementations described herein, the increasing radial distance combined with the decreasing open area facilitates the formation of a substantially uniform radial velocity profile on an inner surface of the substrate. In this way, a fluid distribution index associated with the particulate filter (or other aftertreatment component) may be increased and the pressure drop may be decreased compared to conventional filters. Additionally, in the case of a particulate filter, the design of the particulate filter described herein facilitates a decreased size and cost compared to many conventional filters.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or diesel exhaust fluid (DEF), into ammonia. The decomposition chamber 104 includes a reductant delivery system 110 having a doser or dosing module 112 configured to dose the reductant into the decomposition chamber 104 (for example, via an injector such as the injector described below). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. Example Particulate Filter

Figure 2:
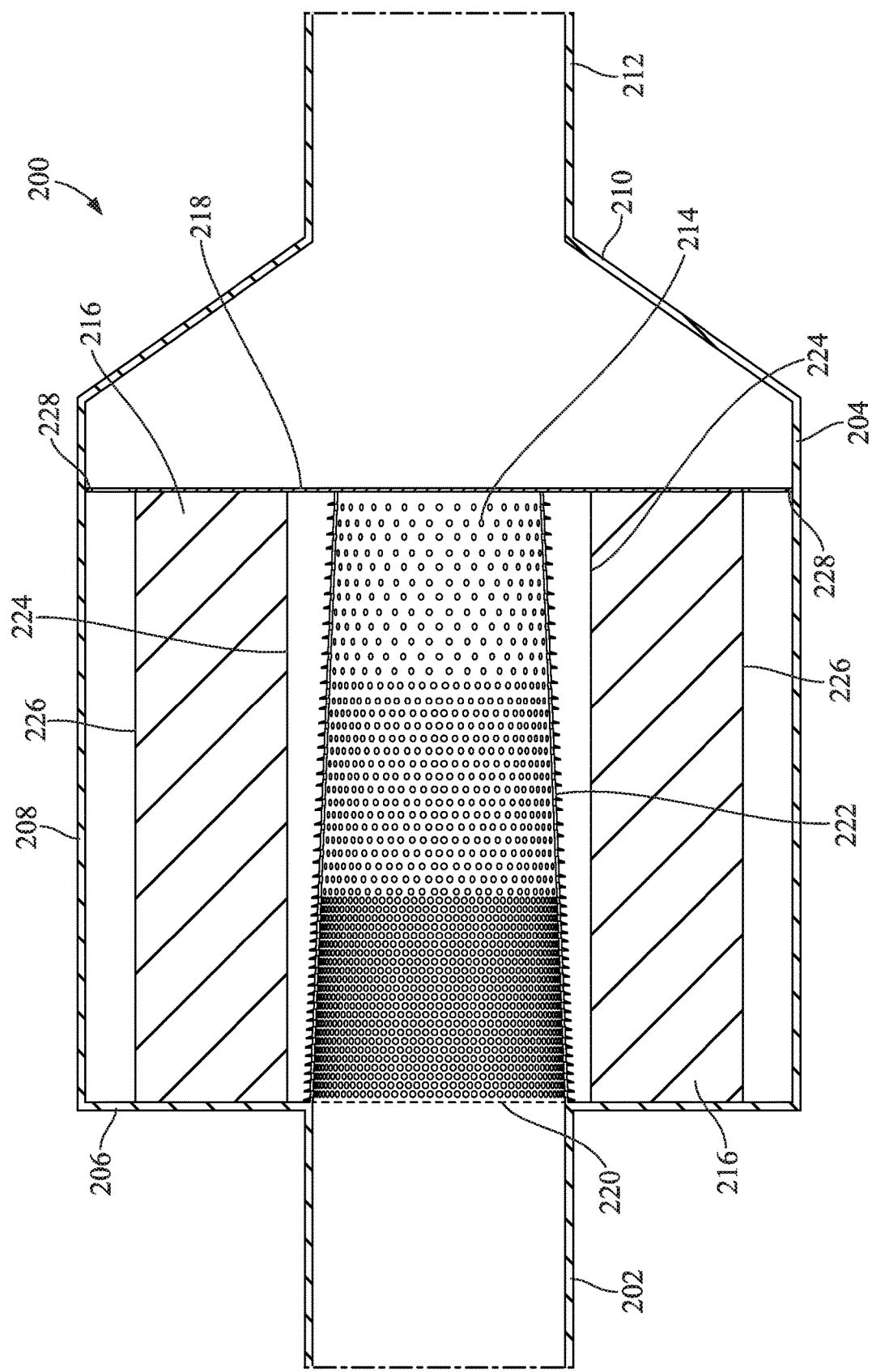
FIG. 2 is a cross-sectional view of a particulate filter including a flow dissipater.
Figure 3:
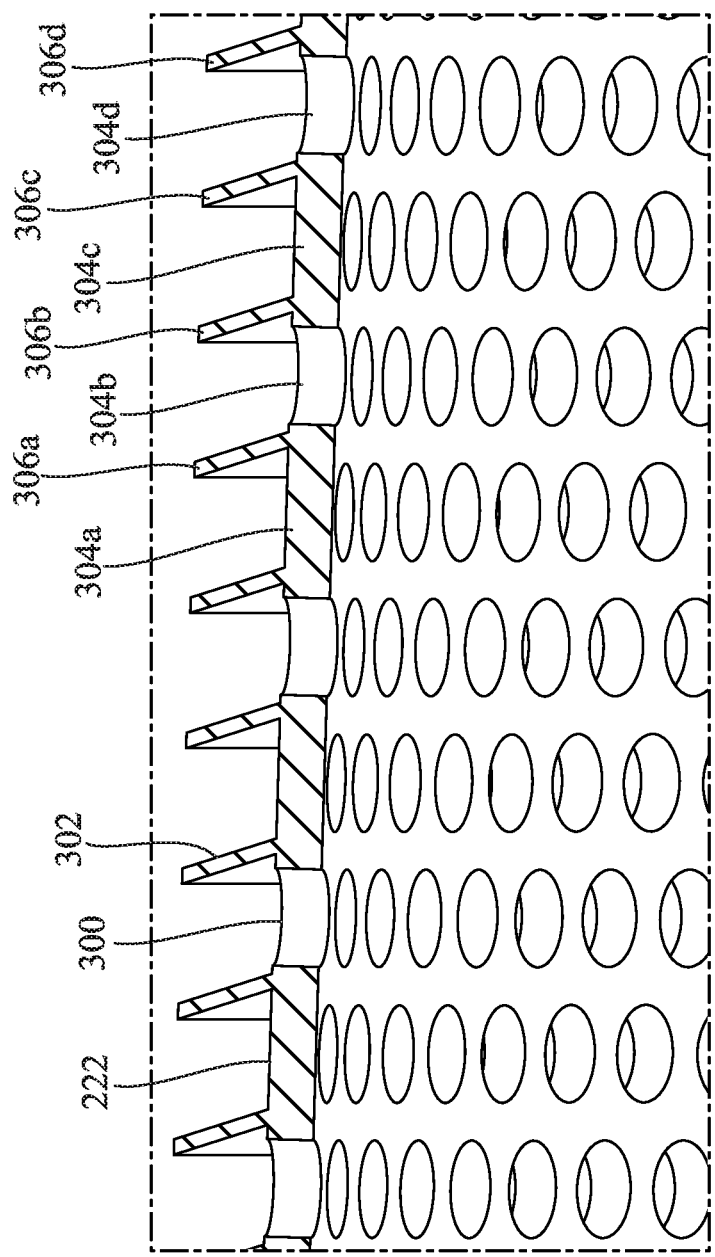
FIG. 3 is a detailed view of the flow dissipater shown in FIG. 2.

FIGS. 2-3 depict a particulate filter 200 according to an exemplary embodiment. While a particulate filter 200 is described in this particular embodiment, it is understood that the relevant structure in this and similar embodiments may constitute other aftertreatment components such as a SCR catalyst, a perforated tube, a pipe, a manifold, a decomposition chamber or reactor, a doser, a dosing module, and others. The particulate filter 200 is configured to receive exhaust gases (e.g., combustion gases from an internal combustion engine, etc.) and to selectively treat (for example, filter) the exhaust gases before providing the treated (for example, filtered) exhaust gases to subsequent components in an aftertreatment system. For example, the particulate filter 200 may be configured to capture exhaust gas and to remove particulate matter (PM) such as soot particles. The particulate filter 200 includes an inlet connector tube 202 configured to receive an axial flow of the exhaust gases. The inlet connector tube 202 is configured to be coupled (e.g., attached, connected, etc.) to another component in the aftertreatment system. In some applications, the inlet connector tube 202 is connected to a manifold (e.g., header, etc.) of an internal combustion engine (e.g., diesel engine, etc.). The inlet connector tube 202 is defined by a diameter (e.g., a diameter common to components in the aftertreatment system, a diameter common to the internal combustion engine, etc.).

The particulate filter 200 also includes a chamber 204 that is defined by a first face 206, a radial wall 208, and a second face 210. The radial wall 208 operatively couples the first face 206 and the second face 210. The radial wall 208 defines a diameter of the chamber 204. In one embodiment, the radial wall 208 defines a diameter of the chamber 204 that is greater than a diameter of the inlet connector tube 202. According to various embodiments, the first face 206 extends orthogonally from the inlet connector tube 202. In many applications, the radial wall 208 is parallel to the inlet connector tube 202. The second face 210 is contiguous with the radial wall 208 and with an outlet connector tube 212. In various applications, the second face 210 is disposed along an angle from the radial wall 208 to the outlet connector tube 212. Like the inlet connector tube 202, the outlet connector tube 212 is configured to be coupled to another component in the aftertreatment system. In some applications, the outlet connector tube 212 is connected to a decomposition reactor of the aftertreatment system. The outlet connector tube 212 is defined by a diameter that may be equal to the diameter of the inlet connector tube 202, for example. The chamber 204 is positioned (e.g., located, etc.) between the inlet connector tube 202 and the outlet connector tube 212.

The particulate filter 200 also includes a flow dissipater 214 (e.g., a perforated tube, etc.) and a substrate 216 (e.g., a filter, membrane, scrubber, etc.). According to various embodiments, the flow dissipater 214 and the substrate 216 are located (e.g., positioned, contained, etc.) within the chamber 204. The flow dissipater 214 is configured to receive the exhaust gases from the inlet connector tube 202 and to provide the exhaust gases to the substrate 216. For example, the flow dissipater 214 may be positioned around the inlet connector tube 202 such that substantially no exhaust gasses bypass the flow dissipater 214. The substrate 216 is configured to receive the exhaust gases and to provide filtered exhaust gases to the outlet connector tube 212. According to an exemplary embodiment, the particulate filter 200 also includes a cap 218. The cap 218 is contained within the chamber 204 and functions to substantially prevent exhaust gases from bypassing (e.g., circumventing, etc.) the substrate 216.

An exemplary flow of the exhaust gases through the particulate filter 200 will now be described. The exhaust gases flow through the inlet connector tube 202 and into the flow dissipater 214 through an inlet defined by a first edge 220 of the flow dissipater 214. According to various embodiments, the first edge 220 is circular and has a diameter that is larger than a diameter of the inlet connector tube 202 such that the first edge 220 can interface with the first face 206 around (e.g., over, about, etc.) the inlet connector tube 202. In other embodiments, the first edge 220 is substantially circular (e g, many-sided polygonal, etc.). The first edge 220 interfaces with the first face 206 such that the exhaust gasses are prevented from bypassing the flow dissipater 214. The first edge 220 may be affixed to the first face 206 such as through the use of adhesive. The first edge 220 may also be attached to the first face 206 such as through material bonding processes (e.g., welding, fusing, etc.) or through the use of fasteners (e.g., rivets, bolts, etc.). The first edge 220 may also interface with the first face 206 through an interference fit with the cap 218 (i.e., the cap 218 biases the first edge 220 against the first face 206) such that the flow of exhaust gases between the first edge 220 and the first face 206 is substantially eliminated.

Exhaust gases flow from the inlet of the flow dissipater 214 into an interior region defined by a body 222. The body 222 defines the shape of the flow dissipater 214. According to various embodiments, the body 222 is substantially cylindrical or a variant thereof. As shown in FIG. 2, the body 222 is frustoconical (e.g., has a shape of a frustum of a cone, etc.). Referring to FIG. 3, the body 222 includes a plurality of perforations 300 (e.g., holes, etc.) and a plurality of vanes 302 (e.g., ribs, fins, projections, protuberances, etc.). Each of the plurality of perforations 300 may be circular, oval shaped, rectangular, square-shaped, oblique, or otherwise shaped such that the body 222 is tailored for a target application. Additionally, the plurality of perforations 300 depicted in FIG. 3 are arranged in a pattern (e.g., grouping, design, configuration, etc.). As shown in FIG. 3, the plurality of perforations 300 are arranged in a plurality of rows 304a-304d, and the plurality of vanes 302 are arranged in a plurality of rows 306a-306d. The rows 304a-304d and the rows 306a-306d are for illustrative purposes only and it is understood that the body 222 may include more or less of the rows 304a-304d and of the rows 306a-306d.

Each of the rows 304a-304d of the perforations 300 and the rows 306a-306d of the vanes 302 are disposed circumferentially about the body 222. Each of the rows 304a-304d of the perforations 300 and the rows 306a-306d of the vanes 302 are defined by a number of the perforations 300 or the vanes 302, respectively, and a distance from a reference point, such as first edge 220. For example, each of the rows 306a-306d of the vanes 302 may include a single vane 302 that is continuous about the circumference of the body 222. According to various embodiments, the number of the perforations 300 or the vanes 302 are uniformly distributed (e.g., with a uniform interspacing, etc.) along each of the rows 304a-304d of the perforations 300 and the rows 306a-306d of the vanes 302, respectively. For example, each of the rows 304a-304d of the perforations 300 may include twenty of the perforations 300 uniformly distributed along the circumference of the body 222.

According to various embodiments, the rows 304a-304d of the perforations 300 are alternated with, or separated by, the rows 306a-306d of the vanes 302 along a length of the body 222. For example, as shown in FIG. 3, the body 222 includes the row 304a of the perforations 300, the row 306a of the vanes 302, the row 304b of the perforations 300, the row 306b of the vanes 302, the row 304c of the perforations 300, the row 306c of the vanes 302, the row 304d of the perforations 300, and the row 306d of the vanes 302. The perforations 300 may be defined by a diameter while the vanes 302 may be defined by a nonzero angle (e.g., slant, etc.) relative to the body 222 (e.g., sixty-five degrees, seventy degrees, etc.) and a thickness (e.g., one millimeter, etc.). The perforations 300 and the vanes 302 may possess various shapes, sizes, and lengths such that the particulate filter 200 is tailored for a target application. Similarly, the rows 304a-304d and the rows 306a-306d may also be tailored (e.g., such that the perforations 300 are distributed on only a part of the row 304a, such that the vane 302 is only disposed along a portion of the row 306d, such that more or less rows are included, etc.) such that the particulate filter 200 is tailored for a target application. In an alternative application, any of the rows 304a-304d and the rows 306a-306d may include a number of the perforations 300 and a number of the vanes 302.

The exhaust gases flow out of the interior region of the flow dissipater 214 through the plurality of the perforations 300. As the exhaust gases flow out of the plurality of perforations 300, the exhaust gases may contact the plurality of the vanes 302. The plurality of vanes 302 functions to counter axial momentum of the incoming flow of exhaust gases and to direct (e.g., turn, etc.) the exhaust gases in a target direction (e.g., slightly more than ninety degrees from horizontal, etc.). The exhaust gases travel from the flow dissipater 214 to the substrate 216. The exhaust gases enter the substrate 216 through an inner surface 224 of the substrate 216. According to the embodiment shown in FIG. 2, the substrate 216 is substantially tube-shaped (i.e., shaped like a hollow cylinder).

The body 222 of the flow dissipater 214 is tailored such that a flow velocity or flow rate (e.g., by mass, by volume, etc.) of the exhaust gases into the substrate 216 is substantially uniform (e.g., substantially equal, etc.) along the inner surface 224 of the substrate 216. This results in a radial velocity profile across the inner surface 224 of the substrate 216 that is substantially uniform. This tailoring may involve varying the number of the perforations 300 and/or of the vanes 302, varying the concentration of the perforations 300 and/or the vanes 302 along the body 222 (e.g., such that the perforations 300 are more heavily concentrated proximate to the first edge 220, etc.), varying the shape and/or size of individual perforations 300 and/or vanes 302 or groups of perforations 300 and/or the vanes 302 (e.g., the perforations are progressively more oval-shaped proximate to the first edge 220, etc.), and varying the shape of the body 222 (e.g., from frustoconical to cylindrical, from frustoconical to conical, etc.).

According to an exemplary embodiment, the plurality of perforations 300 are more concentrated along the body 222 proximate to the first edge 220 and progressively less concentrated at increasing distances from the first edge 220. For example, the row 304a of the perforations 300 may include more of the perforations 300 than the row 304b of the perforations 300, which includes more of the perforations 300 than the row 304c of the perforations 300, etc. In another example, the distance between each of the rows 304a-304d of the perforations 300 and the rows 306a-306d of the vanes 302 may be less proximate to the first edge 220 and progressively larger at increasing distances from the first edge 220. In this way, the body 222 has an open area (i.e., an area not containing material) that progressively decreases (e.g., is reduced, etc.) at increasing distances from the first edge 220 (e.g., from upstream to downstream) as defined by the plurality of perforations 300. This variation in the open area of the body 222 facilitates the formation of the substantially uniform radial velocity profile on the inner surface 224 of the substrate 216.

The configuration of the body 222 compliments the configuration of the substrate 216. Because the open area of the body 222 varies along the length of the body 222, an increasing radial distance between the body 222 and the inner surface 224 of the substrate 216 is correspondingly required. For example, at a location proximate to the first edge 220, where the open area is larger because there are more of the plurality of perforations 300, the radial distance between the body 222 of the flow dissipater 214 and the inner surface 224 of the substrate 216 is less than at a location away from the first edge 220, where the open area is smaller because there are less of the perforations 300.

In the embodiment depicted in FIG. 2, the plurality of perforations 300 are more concentrated proximate to the first edge 220, and thus the open area is larger, and the radial distance between the body 222 of the flow dissipater 214 is increased away from the first edge 220 through the frustoconical shape of the flow dissipater 214. This increasing radial distance along the length of the flow dissipater 214, as measured from the first edge 220, facilitates merging of the exhaust gases exiting the flow dissipater 214 away from the first edge 220. As the radial distance between the flow dissipater 214 and the inner surface 224 of the substrate 216 increases, the open area of the flow dissipater 214 (e.g., the number of the perforations 300, the size of the perforations 300, etc.) correspondingly decreases. In this way, the radial distance and the open area are inversely proportional. This increasing radial distance cooperates with the variation in open area to facilitate the formation of the substantially uniform radial velocity profile on the inner surface 224 of the substrate 216.

After entering the substrate 216 through the inner surface 224, the exhaust gasses are filtered through the substrate 216. The filtered exhaust gases exit the substrate 216 through an outer surface 226. According to various embodiments, the outer surface 226 is substantially cylindrical. From the outer surface 226, the filtered exhaust gasses flow between the substrate 216 and the radial wall 208 and through a number of channels 228 in the cap 218 towards the second face 210 of the chamber 204. Depending on the configuration of the cap 218, the filtered exhaust gases may flow through one, two, or more channels 228. According to various embodiments, the channels 228 are circumferentially disposed along the cap 218 between the substrate 216 and the radial wall 208. The second face 210 directs the filtered exhaust gases to the outlet connector tube 212 where the filtered exhaust gases are provided to downstream components of the aftertreatment system. The second face 210 may be shaped, sloped, or otherwise configured to facilitate mixing of the filtered exhaust gases from the number of channels 228.

Figure 4:
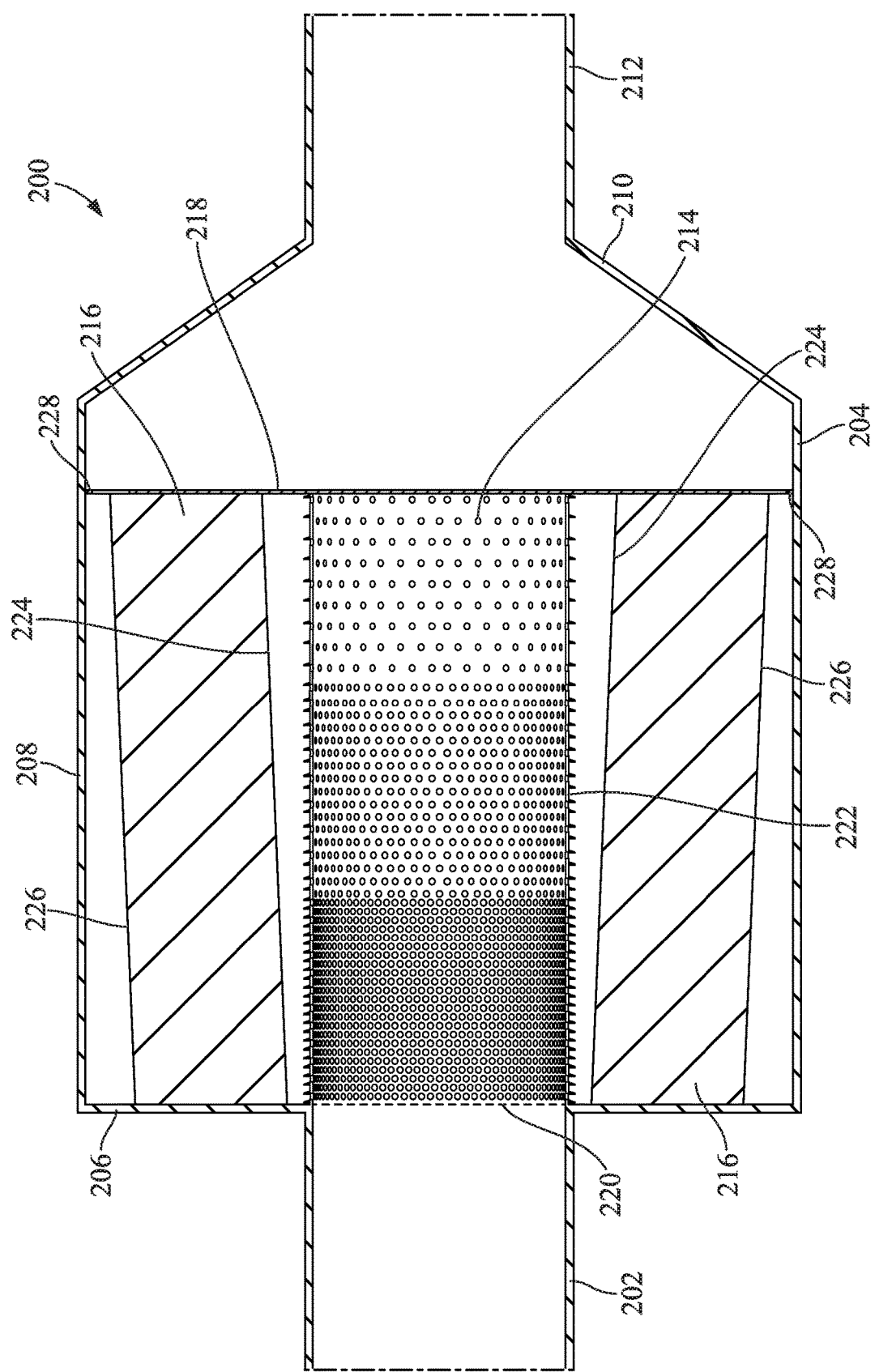
FIG. 4 is a cross-sectional view of another particulate filter.

Variations of the particulate filter 200 may also be employed that achieve the substantially uniform radial velocity profile on the inner surface 224 of the substrate 216. As shown in FIG. 4, the increasing radial distance between the flow dissipater 214 and the inner surface 224 of the substrate 216 can also be achieved by implementing a flow dissipater 214 with a substantially cylindrical shape, as opposed to the frustoconical shape shown in FIG. 2, and a substrate 216 with a frustoconical shape, as opposed to the substantially cylindrical shape shown in FIG. 2. According to the embodiment shown in FIG. 4, the substrate 216 has a first diameter proximate to the first edge 220 that is smaller than a second diameter of the substrate 216 that is not proximate to the first edge 220.

The substrate 216 is defined by a substrate restriction. The substrate restriction measures the decrease in fluid pressure from the inner surface 224 of the substrate 216 to the outer surface 226 of the substrate 216 at a given flow rate. A low substrate restriction will cause a smaller difference in fluid pressure from the inner surface 224 to the outer surface 226, compared to a high substrate restriction, which will cause a larger difference in fluid pressure from the inner surface 224 to the outer surface 226, when both sections have the same fluid flow rate. The substrate restriction of the substrate 216 may be determined by, for example, variable cell density, cell structure, and other similar properties. According to various embodiments, the substrate restriction is uniform along the length of the substrate 216. However, another variation of the particulate filter 200 utilizes a substrate 216 having a variable substrate restriction along the length of the substrate 216. This variation in substrate restriction of the substrate 216 may be implemented, for example, with the embodiment shown in FIG. 2. In one embodiment, the substrate 216 has a progressively increasing substrate restriction from the first face 206 to the cap 218. In this embodiment, the flow rate of the exhaust gases through the substrate 216 is greater proximate to the first face 206 than proximate to the cap 218.

The flow of the exhaust gases across the inner surface 224 of the substrate 216 may be analyzed by calculating a flow distribution index (FDI). The FDI essentially tracks how well the flow of the exhaust gasses is distributed over the inner surface 224 of the substrate 216. The higher the FDI, the better this flow is distributed. The FDI is calculated using the following equation:

$$FDI = 1 - \frac{1}{2}\left(\sum_{i=1}^{n} \frac{A_i}{A_{tot}} \frac{|V_i - V_{avg}|}{V_{avg}}\right) \quad (1)$$

where n is the number of measurement locations, $A_i$ is the area of the measurement location i, $A_{tot}$ is the total area of inner surface 224, $V_i$ is the flow velocity at the measurement location i, and $V_{avg}$ is the average flow velocity on the inner surface 224. In one embodiment, the FDI of the particulate filter 200 was calculated to be 0.938 at the rated flow point. Conventional filters with some sort of conventional flow distribution components are typically capable of obtaining an FDI of approximately 0.815 at the rated flow point. In comparison, an analysis was performed of a conventional filter without a flow distribution component which revealed an FDI of 0.263 at the rated flow point. Accordingly, the particulate filter 200 is capable of increasing the FDI by approximately fifteen percent when compared to conventional filters with conventional flow distribution components.

Another metric important to the analysis of the particulate filter 200 is a total pressure drop of the exhaust gasses through the particulate filter 200. For example, the total pressure drop of the particulate filter 200 may be calculated by comparing a pressure of the exhaust gasses entering the inlet connector tube 202 to a pressure of the filtered exhaust gases exiting the outlet connector tube 212. In one embodiment, the pressure drop of the particulate filter 200 was calculated to be 4.50 kilopascals. Conventional filters typically have a pressure drop of 5.42 kilopascals when using some sort of conventional flow distribution component. In comparison, an analysis was performed of a convention filter without a flow distribution component which revealed a pressure drop of 3.74 kilopascals.

TABLE 1

Comparison of the FDI and the pressure drop for the particulate filter 200, a conventional filter having a conventional flow distribution component, and a conventional filter without a flow distribution component.

| Design | Pressure Drop [kPa] | FDI |
|---|---|---|
| The Particulate Filter 200 | 4.50 | 0.938 |
| A Conventional Filter - with a Flow Distribution Component | 5.42 | 0.815 |
| A Conventional Filter - without a Flow Distribution Component | 3.74 | 0.263 |

Figure 5:
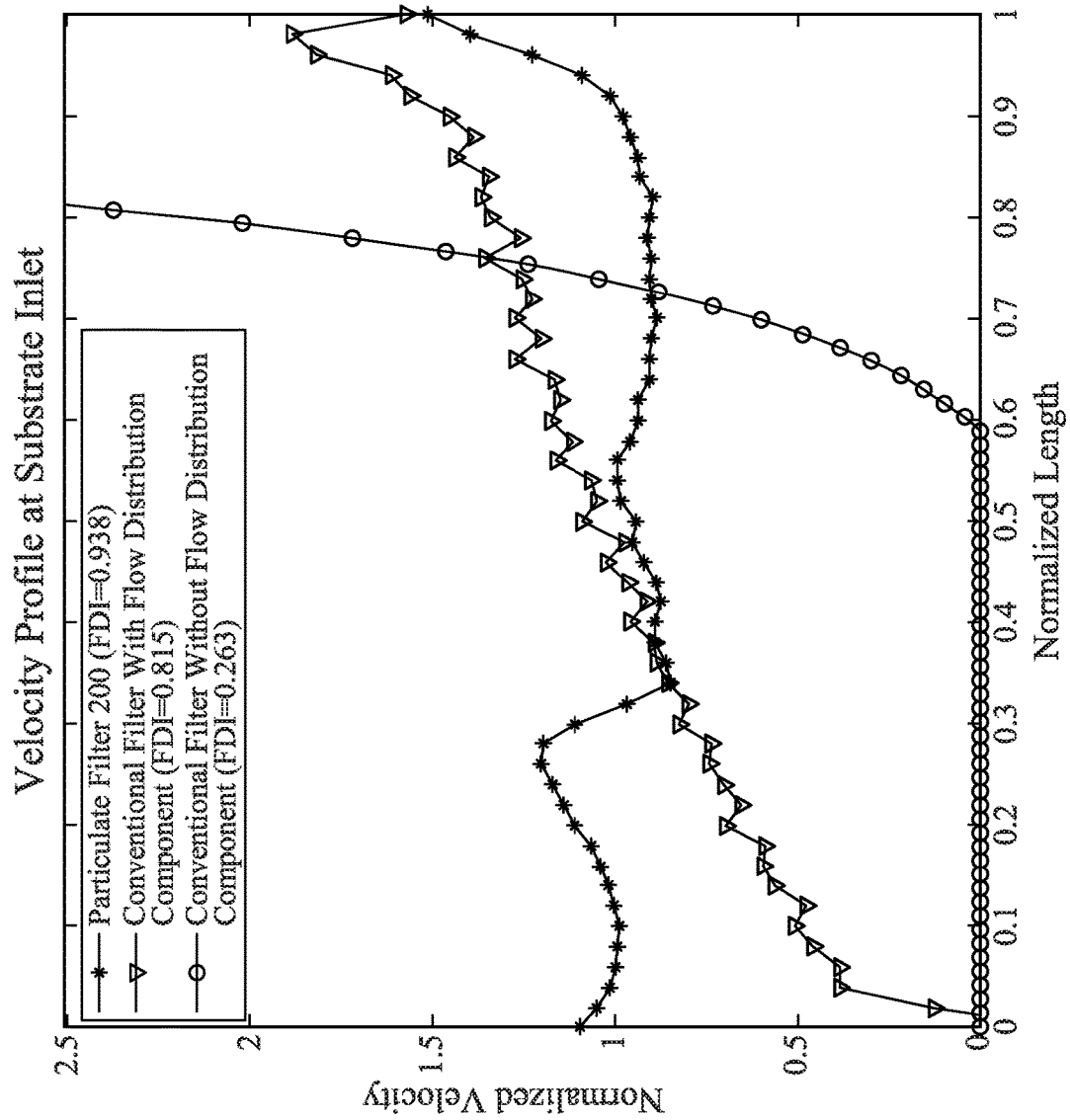
FIG. 5 is a plot of normalized velocity against normalized length for various aftertreatment components including a particulate filter.

As shown in the table above and illustrated in FIG. 5, the particulate filter 200 achieves a relatively high FDI while minimizing pressure drop. In this way, the particulate filter 200 is capable of providing dramatic improvements compared to conventional filters which typically encounter decreases in FDI with decreases in pressure drop. As a result, the particulate filter 200 may be more efficient and desirable than a conventional filter.

Some conventional filters attempt to achieve increased FDI by increasing the size of the conventional filter. These conventional filters typically have greater pressure drop and take up additional space in an application. The design of the particulate filter 200 may facilitate a smaller overall size of the particulate filter 200 compared to conventional filters. For example, the increasing radial distance between the body 222 of the flow dissipater 214 and the inner surface 224 of the substrate 216 minimizes the required overall size of the particulate filter 200 compared to conventional filters that may require larger distances between filters and flow distribution components. This decrease in overall size is of particular importance in applications with compact spaces. This decrease in overall size may also result in decreased costs (e.g., manufacturing costs, installation costs, maintenance costs, etc.) associated with the particulate filter 200 compared to conventional filters.

In FIGS. 2 and 4, the substrate 216 is illustrated as receiving radial flow from the flow dissipater 214. However, other implementations of the particulate filter 200 are configured such that the substrate 216 receives axial flow from the flow dissipater 214. For example, the substrate 216 may be positioned downstream of the cap 218, such as between the cap 218 and the second face 210. Further, the flow dissipater 214 may be configured to provide the exhaust gases in an axial flow.

Figure 6:
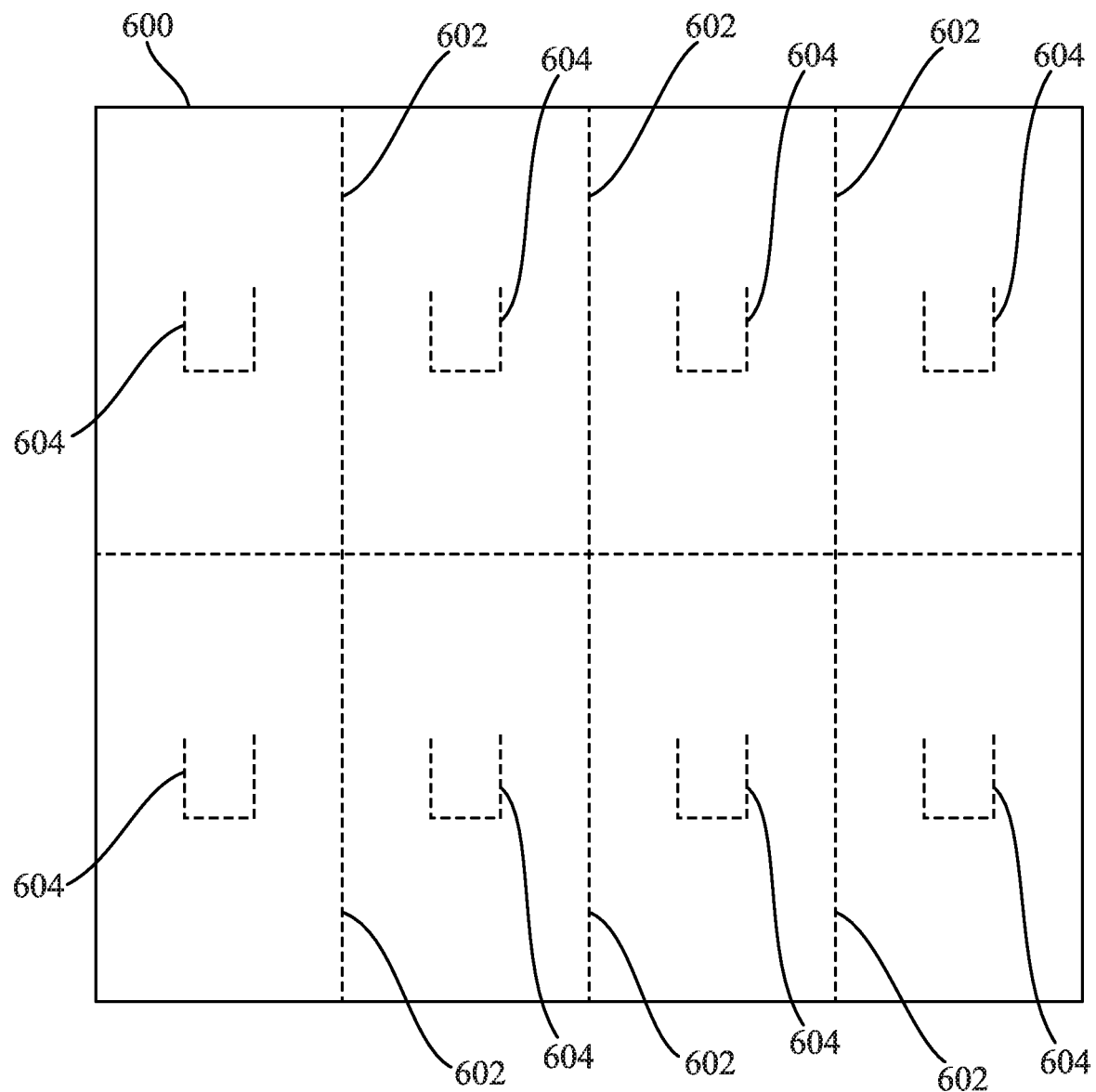
FIG. 6 is plan view of a blank for a flow dissipater for use in a particulate filter.

FIGS. 6-9 depict a process 900 for manufacturing the flow dissipater 214 according to an exemplary embodiment. As shown in FIG. 6, a blank 600 is prepared for manufacturing. In various examples, the blank 600 is rectangular. In other examples, the blank 600 may be square, rhomboidal, or otherwise shaped. The blank 600 may be a single piece of sheet metal (e.g., aluminum, steel, etc.). As will be further described, the blank 600 is bent along a plurality (e.g., two, three, four, five, etc.) of section lines 602 to form the flow dissipater 214. The section lines 602 are continuous from one lateral edge of the blank 600 to an opposing lateral edge of the blank 600.

As will be further described, the blank 600 includes at least one forming location 604 where a tab will be formed. Similar to the vanes 302, the tabs are utilized by the flow dissipater 214 to direct flow. The blank 600 may include a plurality (e.g., two, three, four, five, etc.) of forming locations 604. In some embodiments, the number of forming locations 604 is one greater than the number of section lines 602.

According to various embodiments, the section lines 602 divide the blank 600 into several equal sections. In these embodiments, the forming locations 604 may be placed in the center of these sections. Alternatively, the forming locations 604 may be placed closer to the section lines 602, along the section lines 602, or such that the forming locations 604 include a portion of the section lines 602. In these alternative embodiments, the length of the tabs 700 may be minimized and the manufacturing cost of the flow dissipater 214 may be reduced.

Figure 7:
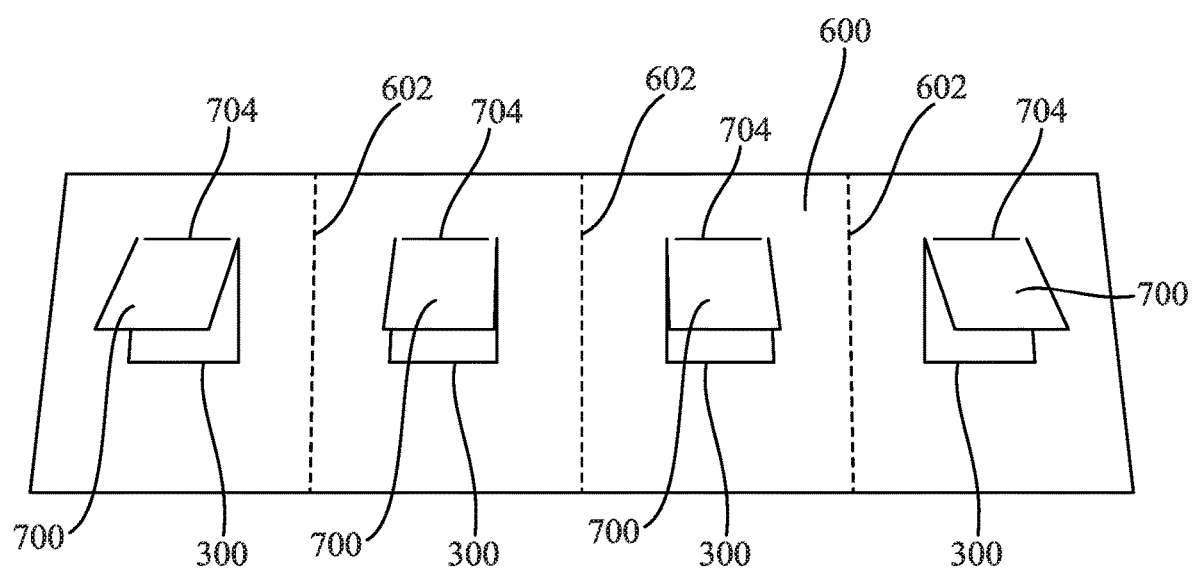
FIG. 7 is top view of the blank for the flow dissipater shown in FIG. 6, including tabs and apertures.

As shown in FIG. 7, the process 900 creates a tab 700, and a corresponding perforation 300 at each of the forming locations 604. The tabs 700 function similar to the vanes 302 in that the tabs function to redirect flow through the plurality of perforations 300 to the substrate 216. The tabs 700 and plurality of perforations 300 may be formed by various manufacturing processes such as die cutting, forming, punching, stamping, cutting, and other similar processes. According to an exemplary embodiment, the blank 600 is cut using a die. When the die is inserted into the blank 600 (step 902), the die cuts the blank 600 such that the tabs 700 and the plurality of perforations 300 are formed (step 904). As the die is pushed through the blank 600, and through the plurality of perforations 300, the die biases the tabs 700 a distance from the blank 600 such that an angle is formed between each of the tabs 700 and the blank 600.

In an exemplary embodiment where the tabs 700 have four sides (i.e., where the tabs are rectangular), the tabs 700 and the plurality of perforations 300 are formed by a die that cuts three of the four sides of the tabs 700. A remaining side 704 structurally joins the tabs 700 to the blank 600. While the tabs 700 are shown as rectangle, the tabs 700 may be in the form of other shapes. For example, the tabs 700 may be triangular, trapezoidal, or have other similar shapes.

According to various embodiments, the angle between each of the tabs 700 and the blank 600 is one-hundred and twenty degrees, as measured along the remaining side 704 between the tab 700 and the adjoining blank 600. In different embodiments, this angle may have various values between one-hundred and eighty degrees and zero degrees. In various applications, all of the tabs 700 and the plurality of perforations 300 are formed simultaneously by the die or an array of die. However, in other applications each of the tabs 700, and the corresponding perforation 300, may be formed individually.

Depending on the application, the angle between the tabs 700 and the blank 600 may be varied such that the flow dissipater 214 is tailored for a target application. For example, the angle between the tabs 700 and the blank 600 may be greater in applications where the flow dissipater 214 includes less of the tabs 700. In some applications, the angles between each of the tabs 700 and the blank 600 are the same. However, in other applications the angles between some of the tabs 700 and the blank 600 may be greater than the angles between others of the tabs 700 and the blank 600. For example, the angle between the tabs 700 and the blank 600 proximate the inlet 220 may be less than the angle between the tabs 700 and the blank 600 away from the inlet 220.

Figure 8:
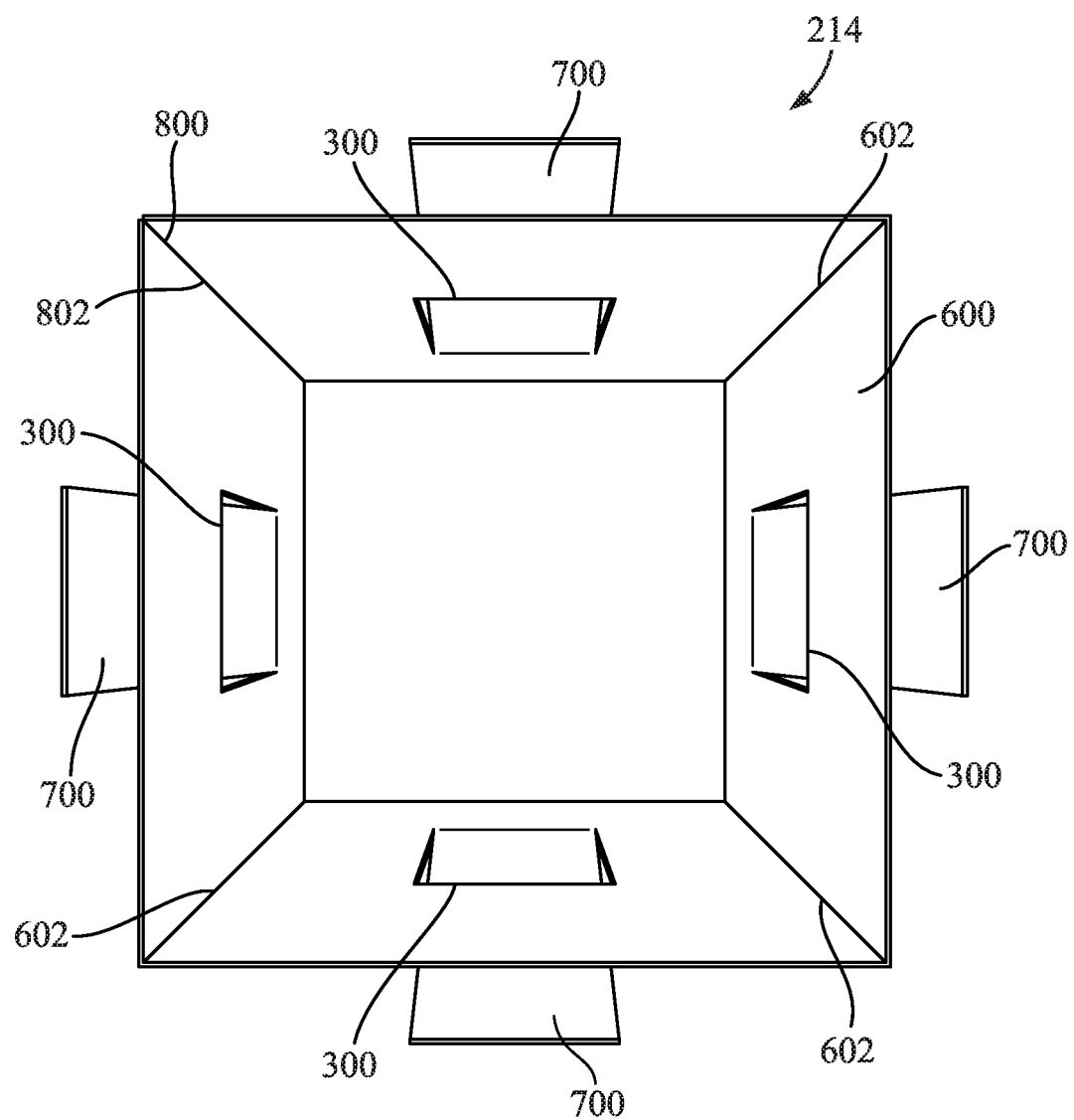
FIG. 8 is top perspective view of a flow dissipater used the blank shown in FIG. 7.
Figure 9:
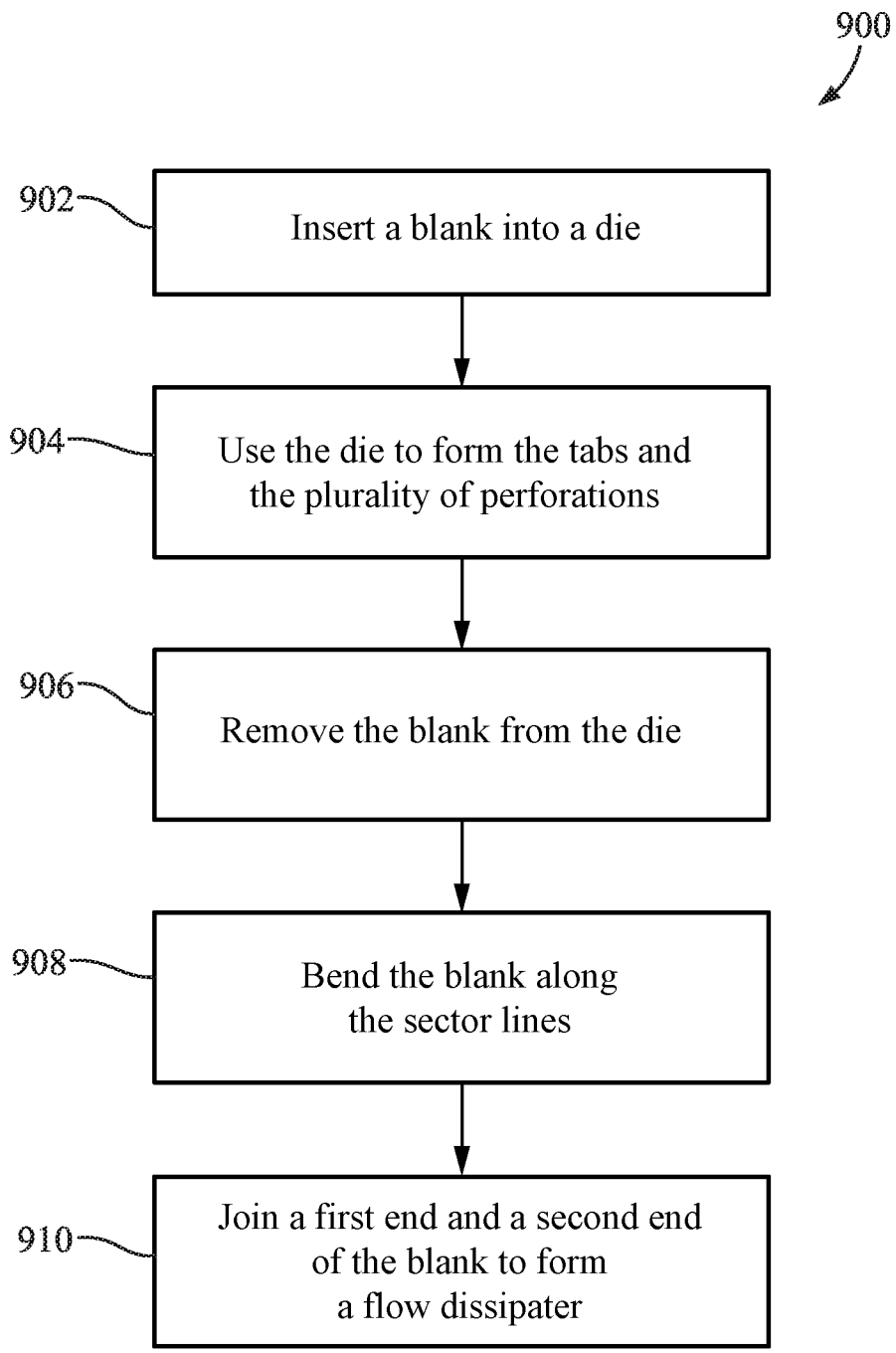
FIG. 9 is a flow diagram of a process for forming a flow dissipater from a blank for a flow dissipater, such as the blank shown in FIG. 7.
Figure 10:
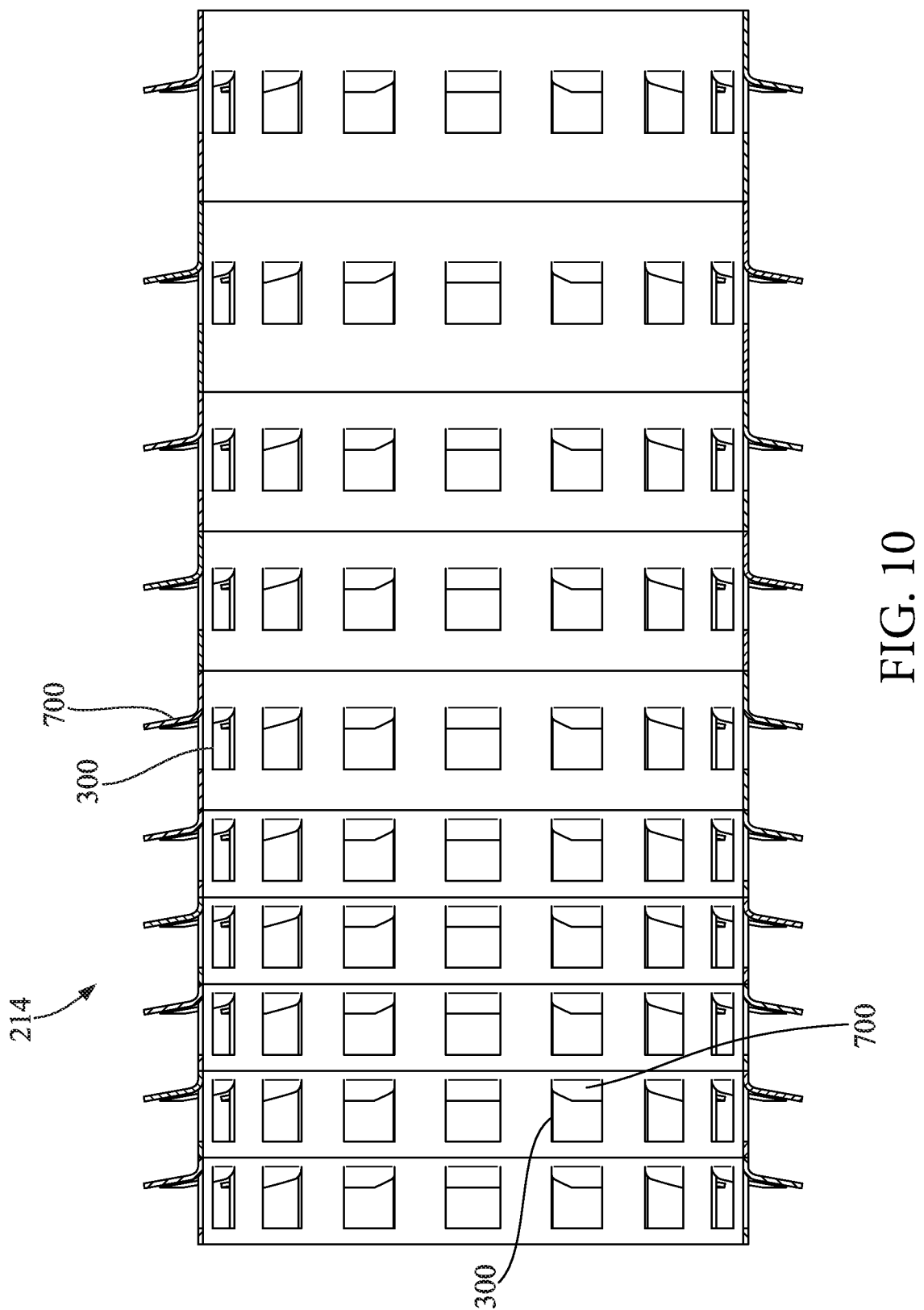
FIG. 10 is a cross-sectional view of a flow dissipater formed using the blank shown in FIG. 7.

The die is removed from the blank 600 (step 906) and the blank 600 is formed into the flow dissipater 214 by joining a first end 800 of the blank 600 with a second end 802 of the blank 600, as shown in FIG. 8. In order to join the first end 800 to the second end 802, the blank 600 is at least partially bent along each of the section lines 602 (step 908). For example, each section the blank 600 (e.g., between adjacent section lines 602, between one section line 602 and an edge of the blank 600, etc.) may be bent approximately ninety degrees along each of the section lines 602. The blank 600 may be bent differently or uniformly on each of the section lines 602 such that the flow dissipater 214 achieves any target shape so that the particulate filter 200 is tailored for a target application. Depending on the number of section lines 602, the flow dissipater 214 may be formed into various polyhedral shapes, such as is shown in FIG. 10. In other embodiments, the blank 600 may be formed into a cylindrical or frustoconical shape. In these embodiments, the blank 600 may be rounded along each of the section lines 602. After the blank 600 has been bent along the section lines 602, the first end 800 and the second end 802 are joined (step 910). The first end 800 and the second end 802 may be joined by, for example, welding, fusing, bonding, riveting, fastening, adhering, or any other similar joining process.

According to various embodiments, the tabs 700 extend outward from the flow dissipater 214. In this way, the flow may be drawn from the flow dissipater 214, through the plurality of perforations 300, and directed to the substrate 216 after being expelled from the plurality of perforations 300. In some embodiments, the tabs 700 are implemented along with the vanes 302. In these embodiments, the tabs 700 and the vanes 302 cooperate to direct the flow to the substrate 216. According to an alternative embodiment, the tabs 700 extend into the flow dissipater 214. In yet another alternative embodiment, the tabs 700 are implemented such that some of the tabs extend into the flow dissipater 214 and some of the tabs 700 extend outwardly from the flow dissipater 214. In one alternative embodiment, at least some of the tabs 700 extend outwardly from the flow dissipater 214 and into the flow dissipater 214.

The process of forming the flow dissipater 214 from the blank 600 as described is relatively simple, low cost, and easily reproducible. Because the tabs 700 and the plurality of perforations 300 are formed simultaneously, the amount of manufacturing processes required to form the flow dissipater 214 is reduced. Further, the tabs 700 are formed in a no-waste manner thereby decreasing the overall cost of the flow dissipater 214. In other words, a length and a width of each of the plurality of perforations 300 is equal to a length and an opening, respectively, of each of the tabs 700.

Additionally, because the tabs 700 are structurally integrated within the blank 600 along the remaining side 704, the tabs 700 are unlikely to structurally fail during use of the flow dissipater 214. In this way, the flow dissipaters 214 can be easily produced and the cost of the particulate filter 200 can be minimized, thereby increasing the value of the particulate filter 200 to a consumer.

As shown in FIG. 8, the tabs 700 and the plurality of perforations 300 are formed such that the remaining side 704 is orthogonal to a central axis of the flow dissipater 214 and such that the remaining side 704 is on a downstream end of the perforation 300. In this way, the tabs 700 may be acutely angled towards incoming flow and the tabs 700 may be configured to direct flow radially out of the flow dissipater 214. However, in an alternative embodiment the remaining side 704 is on an upstream end of the perforation 300.

In these embodiments, the flow dissipater 214 may include any number of the tabs 700 at various locations, such as the embodiment shown in FIG. 10. For example, the flow dissipater 214 may include a plurality of the tabs 700 in series and/or in parallel. Similarly, the tabs 700 may be varying sizes. For example, the flow dissipater 214 may incorporate tabs 700 having different sizes along the length of the flow dissipater 214.

IV. Construction of Exemplary Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid, such as exhaust, water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another. As described herein, "preventing" should be interpreted as potentially allowing for de minimus circumvention (e.g., less than 1%) of the exhaust gases around the substrate 216 or the flow dissipater 214.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:
1. An aftertreatment component, comprising:
    an inlet connector tube that receives exhaust gas;
    an outlet connector tube;
    a chamber between the inlet connector tube and the outlet connector tube;
    a flow dissipater positioned within the chamber, wherein the flow dissipater is configured to receive the exhaust gas from the inlet connector tube and to expel the exhaust gas via a plurality of perforations, wherein the plurality of perforations define an open area of the flow dissipater, and wherein the open area of the flow dissipater is greatest proximate to the inlet connector tube and progressively decreasing proximate to the outlet connector tube; and
    a substrate positioned within the chamber and spaced from the flow dissipater, wherein the substrate extends around the flow dissipater and is configured to receive the exhaust gas from the flow dissipater and to provide treated exhaust gas to the outlet connector tube.

2. The aftertreatment component of claim 1, further comprising a cap positioned within the chamber, the cap configured to prevent the exhaust gas from circumventing the substrate.

3. The aftertreatment component of claim 2, wherein the cap comprises a channel configured to receive the treated exhaust gas from the substrate and to provide the treated exhaust gas to the outlet connector tube.

4. The aftertreatment component of claim 1,
wherein the flow dissipater further comprises a plurality of vanes extending from the flow dissipater; and
wherein the plurality of vanes are configured to redirect the exhaust gas expelled via the plurality of perforations.

5. The aftertreatment component of claim 4, wherein the plurality of perforations are arranged in a first plurality of concentric rows and a second plurality of concentric rows, the first plurality of concentric rows and the second plurality of concentric rows alternating along the flow dissipater.

6. The aftertreatment component of claim 1,
wherein the flow dissipater further comprises a plurality of tabs extending into the flow dissipater; and
wherein the plurality of tabs redirect the exhaust gas after being expelled through the plurality of perforations.

7. The aftertreatment component of claim 6, wherein each of the plurality of tabs is structurally integrated within the flow dissipater such that the plurality of tabs define the plurality of perforations.

8. The aftertreatment component of claim 7,
wherein each of the plurality of tabs is rectangular in shape; and
wherein the flow dissipater is polyhedral in shape.

9. The aftertreatment component of claim 1, wherein the flow dissipater is frustoconical in shape.

10. The aftertreatment component of claim 9,
wherein the flow dissipater is defined by a first diameter proximate to the inlet connector tube and a second diameter proximate to the outlet connector tube, the second diameter less than the first diameter; and
wherein the substrate is cylindrical in shape such that a radial distance between the flow dissipater and the substrate gradually increases from a location proximate to the inlet connector tube to a location proximate to the outlet connector tube.

11. The aftertreatment component of claim 10, wherein the substrate is defined by a substrate restriction between a first end of the substrate proximate to the inlet connector tube and a second end of the substrate proximate to the outlet connector tube; the substrate restriction progressively increasing from the first end of the substrate to the second end of the substrate.

12. The aftertreatment component of claim 1, wherein the substrate is frustoconical in shape.

13. The aftertreatment component of claim 12,
wherein the substrate is defined by a first diameter proximate to the inlet connector tube and a second diameter proximate to the outlet connector tube, the first diameter smaller than the second diameter; and
wherein the flow dissipater is cylindrical in shape such that a radial distance between the flow dissipater and the substrate gradually increases from a location proximate to the inlet connector tube to a location proximate to the outlet connector tube.

14. An aftertreatment component, comprising:
an inlet that receives exhaust gas;
an outlet;
a chamber positioned between the inlet and the outlet;
a flow dissipater positioned around the inlet, wherein the flow dissipater is configured to receive the exhaust gas from the inlet, and wherein the flow dissipater has a first shape; and
a substrate located within the chamber, wherein the substrate extends around the flow dissipater and is configured to receive the exhaust gas from the flow dissipater and to provide treated exhaust gas to the outlet, and wherein the substrate has a second shape;
wherein the first shape and the second shape cooperate to form a radial gap extending an entire distance between the flow dissipater and the substrate, the radial gap having a first length proximate to the inlet and a second length, larger than the first length, proximate to the outlet.

15. The aftertreatment component of claim 14, further comprising:
a cap located within the chamber, wherein the cap is configured to prevent the exhaust gas from circumventing the substrate;
wherein the cap comprises a channel that is configured to receive the treated exhaust gas from the substrate and to provide the treated exhaust gas to the outlet.

16. The aftertreatment component of claim 14, wherein the flow dissipater is configured to expel the exhaust gas via a plurality of perforations, wherein the plurality of perforations define an open area of the flow dissipater, and wherein the open area of the flow dissipater is greatest proximate to the inlet and progressively decreasing proximate to the outlet.

17. The aftertreatment component of claim 16, wherein the flow dissipater includes a plurality of vanes, each of the plurality of vanes being continuous about a circumference of the flow dissipater.

18. The aftertreatment component of claim 14, wherein one of the first shape and the second shape is cylindrical.

19. An aftertreatment system, comprising:
a first aftertreatment component configured to provide exhaust gas;
a second aftertreatment component configured to receive treated exhaust gas; and
a third aftertreatment component that is configured to receive the exhaust gas from the first aftertreatment component and to provide the treated exhaust gas to the second aftertreatment component, the third aftertreatment component comprising:
a flow dissipater configured to receive the exhaust gas from the first aftertreatment component in an axial flow and to provide the exhaust gas in a radial flow, wherein the flow dissipater comprises a plurality of perforations and a plurality of vanes configured to cooperatively redirect the axial flow to the radial flow; and
a substrate that extends around the flow dissipater, is separated from the plurality of vanes, and is configured to receive the exhaust gas from the flow dissipater and to provide the treated exhaust gas to the second aftertreatment component.

20. The aftertreatment system of claim 19, wherein the flow dissipater has a first shape and the substrate has a second shape;
wherein the first shape and the second shape cooperate to form a radial gap between the flow dissipater and the substrate; and wherein the radial gap progressively increases from locations proximate to the first aftertreatment component to locations proximate to the second aftertreatment component.

21. The aftertreatment system of claim 20, wherein the plurality of perforations are disposed on the flow dissipater such that the plurality of perforations are progressively less concentrated from locations proximate to the first aftertreatment component to locations proximate to the second aftertreatment component.

22. The aftertreatment system of claim 21, wherein the plurality of perforations are disposed in a plurality of annular rows.

23. The aftertreatment system of claim 20, wherein the third aftertreatment component comprises a particulate filter.

24. The aftertreatment system of claim 20, wherein the third aftertreatment component comprises a selective catalytic reduction catalyst.

\* \* \* \* \*